United States Patent
Purdy et al.

(10) Patent No.: US 12,252,844 B2
(45) Date of Patent: Mar. 18, 2025

(54) APPROACH TO BIOMASS DELIGNIFICATION

(71) Applicant: SixRing Inc., Calgary (CA)

(72) Inventors: Clay Purdy, Medicine Hat (CA); Markus Weissenberger, Calgary (CA); Markus Pagels, Calgary (CA); Kyle G Wynnyk, Calgary (CA); Matthew Dewit, Calgary (CA); Andrew M Corbett, Calgary (CA)

(73) Assignee: SIXRING INC., Calgary (CA)

(*) Notice: Subject to any disclaimer, the term of this patent is extended or adjusted under 35 U.S.C. 154(b) by 203 days.

(21) Appl. No.: 17/405,026

(22) Filed: Aug. 18, 2021

(65) Prior Publication Data
US 2022/0170206 A1  Jun. 2, 2022

(30) Foreign Application Priority Data
Nov. 27, 2020 (CA) .................. CA 3100968

(51) Int. Cl.
*D21C 3/04* (2006.01)
*D21C 3/00* (2006.01)
*D21C 9/16* (2006.01)

(52) U.S. Cl.
CPC ............ *D21C 3/04* (2013.01); *D21C 3/003* (2013.01); *D21C 9/163* (2013.01)

(58) Field of Classification Search
CPC ...... C09K 23/50; C09K 2101/00; D21C 3/04; D21C 3/20; D21C 3/003; D21C 3/022; D21C 3/045; D21C 9/163; D21C 9/166; D21C 9/005; D21C 1/04; D21C 1/08
See application file for complete search history.

(56) References Cited

U.S. PATENT DOCUMENTS

| | | | | |
|---|---|---|---|---|
| 3,556,883 A * | 1/1971 | Akira | ............... | C23C 22/52 252/79.4 |
| 3,801,512 A * | 4/1974 | Solenberger | ............... | C23F 1/16 252/406 |
| 3,869,401 A * | 3/1975 | Ernst | ............... | C01B 15/037 8/111 |
| 4,410,397 A * | 10/1983 | Kempf | ............... | D21C 9/163 423/273 |
| 4,459,216 A * | 7/1984 | Nakazato | ............... | C23G 1/103 252/79.4 |
| 6,176,937 B1 * | 1/2001 | Colgan | ............... | C23F 3/06 134/28 |
| 11,982,052 B2 * | 5/2024 | Purdy | ............... | D21C 3/20 |
| 12,123,138 B2 * | 10/2024 | Purdy | ............... | D21C 9/16 |
| 2015/0087030 A1 | 3/2015 | Jain et al. | | |
| 2024/0052566 A1 * | 2/2024 | Leksmon | ............... | D21C 7/08 |
| 2024/0209159 A1 * | 6/2024 | Enriquez | ............... | C08B 37/0003 |
| 2024/0318381 A1 * | 9/2024 | Purdy | ............... | D21C 3/003 |

FOREIGN PATENT DOCUMENTS

WO  2019072386 A1  4/2019

OTHER PUBLICATIONS

PCT/CA2021/000078 International Search Report and Written Opinion dated Nov. 24, 2021.
Zhang, X. et al., "Effect of the temperature on the dissolution of corn straw in ethanol solution", RSC Advances, 2016, 6, 102306-102314 published Oct. 21, 2016, Abstract.

* cited by examiner

*Primary Examiner* — Jane L Stanley
(74) *Attorney, Agent, or Firm* — Blank Rome LLP

(57) ABSTRACT

Method of delignification of plant material, said method comprising: providing said plant material comprising cellulose fibres and lignin; exposing said plant material requiring to a composition comprising:
 an acid;
 a capping agent; and
 a peroxide;
for a period of time sufficient to remove substantially all (at least 80%) of the lignin present on said plant material. Also disclosed are compositions to accomplish such delignification and processes using such.

19 Claims, No Drawings

APPROACH TO BIOMASS DELIGNIFICATION

FIELD OF THE INVENTION

The present invention is directed to a method of biomass delignification, more specifically to the use of capping agents to minimize lignin depolymerization.

BACKGROUND OF THE INVENTION

Petroleum- or fossil fuel-based products include a vast array of products, as surfactants, pharmaceuticals, plastics and elastomers which are abundant in all aspects of manufacturing consumer products and fuels which are used to power vehicles, homes and industries. Climate change and environmental pressures are forcing society to find alternatives to fossil fuels and petroleum-based products. A well-known source for non-petroleum-based products is lignocellulosic biomass. This is the single most abundant source of carbon-neutral organic materials on the planet and contains most of the required compounds to sustain multiple industries including, but not limited to, energy production, chemicals, food, pharmaceuticals, concrete, various manufacturing and agriculture applications.

There are billions of tons being produced by biosynthesis every year. However, to efficiently separate the three components of lignocellulosic biomass proves to be a challenge for it to be a strong and legitimate competitor or alternative to petroleum-based products. To benefit from lignocellulosic biomass and to be able to further use it, one must be able to separate out the lignin, from the hemicellulose and the cellulose. Cellulose is an abundant, high molecular weight natural polymer that possesses great strength and biodegradability. Depending on the feedstock, cellulose can make up from 40 to 60 percent or in some cases more of the plant material and is found in trees/forestry residue, algae, crops, municipal and industrial waste, and various plants.

Furthermore, due to cellulose encasement between lignin and hemicellulose, the efficient and commercially viable extraction of cellulose will depend greatly on the method and biomass source used during the extraction process. Many current and proposed processing methods may limit the use or alter the structural integrity of the cellulose resulting in a marginal yield and excessive processing costs. In general, cellulose extracted from plant materials contains both an amorphous region and a crystalline region.

It is widely agreed that the technical difficulties in the processes, which are currently inefficient, expensive and difficult to scale, of separating lignin and hemicellulose from the cellulose in the biomass is what prevents such technology from being a viable alternative for petroleum-based or fossil fuel products. Many of the aromatic hydrocarbon molecules yielded from biomass can be utilized or processed using much of the current oil & gas global infrastructure such as pipelines, processing facilities, upgraders, along with downstream assets such as gas stations once the biomass has been converted to fuels. This makes woody biomass the only real alternative to hydrocarbons as the next source of energy for the human race that is arguably carbon-neutral, and that would likely keep much of the current global mid-stream and downstream energy assets in use viable while retaining many jobs with minimal economic disruption. Much of these multi-trillion-dollar assets and many millions of jobs globally would be lost with other alternative energy sources such as solar or wind.

The first step in paper production and most energy-intensive one is the production of pulp. This is one of the current few sources of cellulosic material, although it is very inefficient and energy intensive. Notwithstanding water, wood and other plant materials used to make pulp contain three main components: cellulose; lignin; and hemicellulose. Pulping has a primary goal to separate the fibres from the lignin. Lignin is a three-dimensional crosslinked polymer which figuratively acts as a mortar to hold all the fibres together within the plant. Its presence in finished pulp is undesirable and adds no industrial value to the finished product. Pulping wood refers to breaking down the bulk structure of the fibre source, be it chips, stems or other plant parts, into the constituent fibres. The cellulose fibres are the most desired component with regards to paper manufacturing. Hemicelluloses are shorter branched carbohydrate polymers consisting of various sugar monomers which form a random amorphous polymeric structure. The presence of hemicellulose in finished pulp is also regarded as bringing no value to a paper product. This is also true for biomass conversion. The challenges are similar. Only the desired outcome and constituents are different. Optimal biomass conversion would have the further breakdown to monocarbohydrates as a desired outcome, while the common pulp & paper processes normally stop right after lignin dissolution. With the process taught in this patent there would be many additional valuable constituents including, but not limited to microcrystalline cellulose (MCC), nanocrystalline cellulose (CNC) and cellulose nanofibres (CNF) along with other valuable commercial products yielded from the process effluent.

There are two main approaches to preparing wood pulp or woody biomass: mechanical treatment and chemical treatment. Mechanical treatment or pulping generally consists of mechanically tearing the biomass input apart and, thus, tearing cellulose fibres apart in an effort to separate them from each other. The shortcomings of this approach include: broken cellulose fibres, thus shorter fibres and lignin being left on the cellulose fibres thus being inefficient or non-optimal for most commercial applications. This process also consumes large amounts of energy and is capital intensive. There are several approaches included in chemical pulping. These are generally aimed at the depolymerization of the lignin and hemicellulose into small, water-soluble molecules. These now degraded components can be separated from the cellulose fibres by washing the latter without depolymerizing the cellulose fibres. The chemical process is currently energy intensive requiring high amounts of heat and/or high pressures; in many cases, agitation or mechanical intervention are also required, further adding inefficiencies and costs to the process. In this process much of the effluent is waste product as well.

There exist pulping or treatment methods which combine, to a various extent, the chemical aspects of pulping with the mechanical aspects of pulping. To name a few, one must consider thermomechanical pulping (also commonly referred to as TMP), and chemi-thermomechanical pulping (CTMP). Through a selection of the advantages provided by each general pulping method, the treatments are designed to reduce the amount of energy required by the mechanical aspect of the pulping treatment. This can also directly impact the strength or tensile strength degradation of the fibres subjected to these combination pulping approaches. Generally, these approaches involve a shortened chemical treatment (compared to conventional exclusive chemical pulping) which is then typically followed by mechanical treatment to separate the fibres.

The most common process to make pulp for paper production is the kraft process. In the kraft process, wood chips are converted to wood pulp which is almost entirely pure cellulose fibres. The multi-step kraft process consists of a first step where wood chips are impregnated/treated with a chemical solution. This is done by soaking the wood chips and then pre-heating the wood chips with steam. This step swells the wood chips and expels the air present in the wood chips and replaces the air with the treatment liquid. This produces black liquor, a resultant by-product from the kraft process. It contains water, lignin residues, hemicellulose and inorganic chemicals. White liquor is a strong alkaline solution comprising sodium hydroxide and sodium sulfide. Once the wood chips have been soaked in the various chemical solutions, they undergo cooking. To achieve delignification in the wood chips, the cooking is carried out for several hours at temperatures reaching up to 176° C. At these temperatures, the lignin degrades to yield water soluble fragments. The remaining cellulosic fibres are collected and washed after the cooking step.

U.S. Pat. No. 5,080,756 teaches an improved kraft pulping process and is characterized by the addition of a spent concentrated sulfuric acid composition containing organic matter to a kraft recovery system to provide a mixture enriched in its total sulfur content that is subjected to dehydration, pyrolysis and reduction in a recovery furnace. The organic matter of the sulfuric acid composition is particularly beneficial as a source of thermal energy that enables high heat levels to be easily maintained to facilitate the oxidation and reduction reactions that take place in the furnace, thus resulting in the formation of sulfide used for the preparation of cooking liquor suitable for pulping.

Caro's acid, also known as peroxymonosulfuric acid ($H_2SO_5$), is one of the strongest oxidants known and can be explosive in its pure form. There are several known reactions for the preparation of Caro's acid but one of the most straightforward involves the reaction between sulfuric acid ($H_2SO_4$) and hydrogen peroxide ($H_2O_2$). Preparing Caro's acid in this method allows one yield in a further reaction potassium monopersulfate (PMPS) which is a valuable bleaching agent and oxidizer. While Caro's acid has several known useful applications, one noteworthy is its use in the delignification of wood. But because of its reactivity and dangers associated therewith, it is not a preferred approach to treat large volumes of material such as lignocellulosic biomass or feedstock.

Other methods have been developed for pretreating lignocellulosic feedstocks. These pretreatment methods include dilute acid pretreatment, steam explosion ($CO_2$ explosion), pH-controlled water pretreatment, ammonia fibre expansion, ammonia recycle percolation (ARP), and lime pretreatment (Mosier et al. 2005; Wyman et al. 2005; Yang and Wyman 2008). One approach involves the concept of organosolv. Organosolv pulping is the process to extract lignin from lignocellulosic feedstocks with organic solvents or their aqueous solutions. Organosolv pulping has attracted interest since the 1970's because the conventional pulping processes, kraft and sulfite processes, have some serious shortcomings such as air and water pollution. Organosolv pretreatment is similar to organosolv pulping, but the degree of delignification for pretreatment is not expected/required to be as high as that of pulping. However, a drawback of organosolv pre-treatment is the high temperatures at which the processes are known to be carried out at, upwards of 100-250° C., often times in the range of 185-210° C. Such temperatures require high energy inputs.

Improved processes for delignification need to take into account environmental aspects as well as end-product generation. Ambient temperature processes (20-25 degrees Celsius) are highly desirable as they do not require energy intensive inputs. However, to carry out delignification operations at low temperatures and atmospheric pressure, strong acids are typically required. The strength of the acids used while sufficient to remove lignin present on the lignocellulosic feedstock, can be deleterious to the lignin as it decomposes it beyond any lignin monomers which would be useable in other industries or applications, but can also damage the cellulose being yielded and therefore fail in delivering useable products from said feedstock.

One approach is to modify the acid by incorporating a modifying agent which tempers its reactivity and allows for more controlled/controllable reaction with the lignocellulosic feedstock. According to a preferred embodiment of the present invention, this step will allow for far more control in preventing cellulosic degradation from exposure to the acid systems. However, the presence of a modifying agent will not necessarily prevent the extensive depolymerization of lignin as it is being separated from the cellulose and hemicellulose.

Biofuel production is another potential application for the kraft process. One of the current drawbacks of biofuel production is that it typically requires the use of food grade plant parts (such as seeds) in order to transform the easily accessible carbohydrates into fuel in a reasonably efficient process. The carbohydrates could be obtained from cellulosic fibres, by using non-food grade biomass in the kraft process; however, the energy intensive nature of the kraft process for delignification makes this a less commercially viable option. In order to build a plant based chemical resource cycle there is a great need for energy efficient processes which can utilize plant-based feedstocks that do not compete with human food sources and which are generally expensive to produce.

Research (HUNTLEY, C. "Influence of Strong Acid Hydrolysis Processing on the Thermal Stability and Crystallinity of Cellulose Isolated from Wheat Straw", 2014) has shown that extraction of cellulose from an agricultural waste product such as wheat straw using strong acid hydrolysis such as sulfuric and nitric acids will yield similar crystalline and thermal properties as currently reported in the literature. However, the effect of various strong acids on the polymeric, structural, and thermal properties of cellulose extracted from wheat straw impacted the crystallinity of the end product cellulose and it was found to be desirable to use weaker acids where the crystallinity of the final cellulose product is of importance.

In addition to the recovery of cellulose, the recovery of lignin is increasingly important. Most conversion technologies relating to dissolved lignin use heat and metal catalysts to effectively break down lignin into low molecular weight aromatics which hold value for other uses/applications across industry. Some of the considerations to take into account when exploring various processes include: efficiency of the catalysts used; the stability of the catalysts; control of the condensation and repolymerization reactions of lignin. The condensation and repolymerization of lignin often yield products which cannot be broken down easily using the conventional approaches and therefore lose a tremendous amount of value in terms of future uses/applications in industry. The condensation and repolymerization of lignin have a direct impact on the recovery of target lignin products (such as low molecular weight phenolic compounds). Thus, avoiding the condensation and repolymerization reactions is critical in order to maximize the yields of the target products.

The lignin repolymerization has been a substantial concern during many stages of the process of the delignification of lignocellulosic biomass. Conventional fractionation process, namely biomass pretreatment, focuses on its effectiveness to remove lignin from biomass structure, generally employing acid or base catalysts. The resulting residual solid, mainly lignin, significantly undergoes irreversible repolymerization depending on the pretreatment conditions. This is an outcome which must be avoided in order to extract maximum value from a treatment which is geared at recovering both cellulose and lignin for future uses.

While the kraft pulping process is the most widely used chemical pulping process in the world, it is extremely energy intensive and has other drawbacks, for example, substantial odours emitted around pulp producing plants or general emissions that are now being highly regulated in many pulp and paper producing jurisdictions. In light of the current environmental challenges, economical challenges and climactic changes, along with emission fees being implemented by governments, it is highly desirable to optimize the current pulping processes. In order to provide at least linear quality fibres without the current substantial detriment to the environment during the production thereof.

Accordingly, there still exists a need for a composition capable of performing delignification on lignocellulosic biomass under reduced temperatures and pressures versus what is currently in use without requiring any major additional capital expenditures and adapted to preserve the lignocellulosic biomass constituents as much as possible for further applications.

SUMMARY OF THE INVENTION

According to an aspect of the present invention, there is provided a novel composition comprising an acid, a peroxide and a capping agent wherein said composition demonstrates an ability to perform delignification of lignocellulosic feedstock and provide lignin depolymerization products which have considerable value in various applications/industries. Preferably, a capping agent attaches with dissolved lignin fragments in order to prevent further depolymerization thereof and preserve the fragments for future uses and applications. Additionally, one of the main goals of such a process is the reduction of peroxide consumption due to the elimination of side reactions.

Delignification at low temperatures and at atmospheric pressure typically requires very potent compositions in order to effectively and substantially remove lignin from lignocellulosic feedstock. Ultimately, there are a wide array of consumer products which can use varying qualities of cellulose (i.e. cellulose with different amounts of bound lignin). Cardboard products, for example, contain residual amount of lignin which can reach upwards of 20%. Hence, complete delignification is not always necessary when processing lignocellulosic feedstock. Higher end cellulosic products, such as those used in the pharmaceutical industry, require more complete delignification of lignocellulosic feedstock but the volume amounts of those types of products are generally lower than for cardboards and other bulk transport applications (such as heavy paper and the like).

Nevertheless, lignin as well as lignin monomers have become a valuable by-product of the processing of lignocellulosic feedstock and rather than being burned simply as a source of heat, most often used in the processing of said feedstock, it can be incorporated into the chemical industry as a source of starting material in chemical synthesis for example, creating a very viable and valuable alternative for the chemical industry now dependent on hydrocarbon sources. It is for this reason that it is highly desirable to maintain as complete as possible, the integrity of lignin and lignin monomers (paracoumaryl alcohol, coniferyl alcohol and sinapoyl alcohol) upon their separation from cellulose and hemicellulose.

According to an aspect of the present invention, there is provided a composition comprising:
an acid;
a capping agent; and
a peroxide;
wherein said capping agent is a chemical compound which is capable of reacting with a fragment of dissolved lignin to prevent further unnecessary side reactions.

Preferably, the composition further comprises a modifying agent also referred to as a modifier.

Preferably, the acid and the capping agent are present in a molar ratio ranging from 1:1 to 10:1. More preferably, the acid and the capping agent are present in a molar ratio ranging from 1:1 to 5:1. Even more preferably, the acid and the capping agent are present in a molar ratio ranging from 1:1 to 3:1.

According to a preferred embodiment of the present invention, the acid and the peroxide are present in a molar ratio ranging from 1:1 to 10:1. Preferably, the acid and the peroxide are present in a molar ratio ranging from 1:1 to 5:1. More preferably, the acid and the peroxide are present in a molar ratio ranging from 1:1 to 3:1.

According to a preferred embodiment of the present invention, the acid and the modifying agent are present in a molar ratio ranging from 1:1 to 10:1. Preferably, the acid and the modifying agent are present in a molar ratio ranging from 1:1 to 5:1. More preferably, the acid and the modifying agent are present in a molar ratio ranging from 1:1 to 3:1.

According to a preferred embodiment of the present invention, the acid is sulfuric acid.

According to another preferred embodiment of the present invention, the modifying agent selected from the group consisting of: sulfamic acid; imidazole; N-alkylimidazole; taurine; a taurine derivative; a taurine-related compound; alkylsulfonic acid; arylsulfonic acid; triethanolamine; and combinations thereof. Preferably, the alkylsulfonic acid is selected from the group consisting of: methanesulfonic acid; ethanesulfonic acid; propanesulfonic acid and combinations thereof. Also preferably, the aryl sulfonic acid is selected from the group consisting of: toluenesulfonic acid; benzenesulfonic acid; and combinations thereof.

Preferably, said modifying agent is a compound comprising an amine moiety and a sulfonic acid moiety is selected from the group consisting of: taurine; taurine derivatives; and taurine-related compounds. Preferably also, said taurine derivative or taurine-related compound is selected from the group consisting of: sulfamic acid; taurolidine; taurocholic acid; tauroselcholic acid; tauromustine; 5-taurinomethyluridine and 5-taurinomethyl-2-thiouridine; homotaurine (tramiprosate); acamprosate; and taurates; as well as aminoalkylsulfonic acids where the alkyl is selected from the group consisting of C1-C5 linear alkyl and C1-C5 branched alkyl. Preferably, the alkyl moiety in said linear alkylaminosulfonic acid is selected form the group consisting of: methyl; ethyl (taurine); propyl; and butyl. Preferably, the alkyl moiety in said branched aminoalkylsulfonic is selected from the group consisting of: isopropyl; isobutyl; and isopentyl.

According to another preferred embodiment of the present invention, the modifying agent comprises a compound comprising an amine group and a compound comprising a sulfonic acid moiety. Preferably, the compound containing an amine group has a molecular weight below 300 g/mol. Also preferably, said compound containing an amine group has a molecular weight below 150 g/mol. More preferably, said compound containing an amine group is a secondary amine. Even more preferably, said compound containing an amine group is triethanolamine.

Preferably, said compound comprising a sulfonic acid moiety is selected from the group consisting of: alkylsulfonic acid; and arylsulfonic acid. More preferably, the arylsulfonic acid is selected from the group consisting of: orthanilic acid; metanilic acid; sulfanilic acid; benzenesulfonic acid; and toluenesulfonic acid.

According to a preferred embodiment of the present invention, the capping agent is selected from the group consisting of: boric acid and short chain alcohols. Preferably, the short chain alcohol is selected from the group consisting of: methanol; ethanol; n-propanol; and combinations thereof. Preferably, the capping agent is boric acid.

According to an aspect of the present invention, there is provided a method of delignification of plant material, said method comprising:
  providing said plant material comprising cellulose fibres and lignin;
  exposing said plant material requiring to a composition comprising:
    an acid;
    a capping agent; and
    a peroxide;
for a period of time sufficient to remove substantially all (at least 80%) of the lignin present on said plant material. Preferably, the amount of lignin removed is more than 90%.

According to an aspect of the present invention, there is provided a one-pot process to separate lignin from a lignocellulosic feedstock, said process comprising the steps of:
  providing a vessel;
  providing said lignocellulosic feedstock;
  providing a composition comprising;
    an acid;
    a capping agent; and
    a peroxide;
  exposing said lignocellulosic feedstock to said composition in said vessel for a period of time sufficient to remove substantially all of the lignin present said lignocellulosic feedstock;
  optionally, removing a liquid phase comprising dissolved lignin fragments from a solid phase comprising cellulose fibres.

According to a preferred embodiment of the process of the present invention, the temperature of the composition prior to the step of exposing it to the lignocellulosic feedstock is below 50° C. Preferably, the temperature of the composition prior to the step of exposing it to the lignocellulosic feedstock is below 40° C. More preferably, the temperature of the composition prior to the step of exposing it to the lignocellulosic feedstock is below 30° C. Even more preferably, the temperature of the composition prior to the step of exposing it to the lignocellulosic feedstock is below 25° C. Preferably, said process is carried out at ambient temperature. Preferably, said process is carried out at atmospheric pressure.

According to an aspect of the present invention, there is provided a one-pot process to separate lignin from a lignocellulosic feedstock, said process comprising the steps of:
  providing a vessel;
  providing said lignocellulosic feedstock;
  providing a composition comprising;
    an acid;
    a peroxide;
  exposing said lignocellulosic feedstock to a capping agent and subsequently to said composition in said vessel for a period of time sufficient to remove substantially all of the lignin present said lignocellulosic feedstock;
  optionally, removing a liquid phase comprising dissolved lignin fragments from a solid phase comprising cellulose fibres.

DESCRIPTION OF THE INVENTION

The experiments carried out using an aqueous acidic composition according to a preferred embodiment of the present invention as shown that wood chips can undergo delignification under controlled reaction conditions and eliminate or at least minimize the degradation of the lignocellulosic biomass and cellulose as well as provide lignin degradation products which are soluble (i.e. separated from cellulose). Degradation of cellulose is understood to mean a shortening of cellulose fibres as well as removal of amorphous polymer sections and/or loss of crystallinity. Degradation of lignocellulosic biomass is understood to mean darkening of the biomass due to over-oxidation up to the exothermic formation of carbon black which is indicative of degradation darkening of cellulose, evidencing an uncontrolled acid attack on the cellulose and staining/oxidization thereof.

Preferably, sulfuric acid and the source of peroxide, which, in the case of the experiments conducted was hydrogen peroxide, were present at varying ratios throughout the experiments. However, the capping agent which was also in varying amounts with respect to sulfuric acid provided for desirable cellulose recovery when it was in a 1:1 molar ratio with the acid or when it was in excess. With respect to the modifiers (or modifying agent) it is believed that compounds having a sulfonic acid group along with an amine group can be effective modifying agents for strong acids such as sulfuric acid. The strength of the modified acid is dictated by the moles of sulfuric acid to the moles of the modifying agent. Hence, a composition comprising a molar ratio of 6:1 of sulfuric acid:modifier would be much less reactive than a composition of the same components in a 28:1 molar ratio.

Preferably, the capping agent in these sets of experiments acts to prevent lignin repolymerisation reactions (side reactions) from occurring thereby maintaining the integrity of lignin fragments obtained during the delignification of the wood, biomass or lignocellulosic feedstock which can be processed for future uses/applications.

It is desirable to do so for many reasons. First, the lignin oligomers and/or monomers, because of its several aromatic structures, is a desirable compound to extract from the lignocellulosic biomass with as little degradation as possible. Second, the removal of lignin from the wood structure and away from the cellulose is the goal of any pulping process. Excess depolymerization of the lignin is quite unnecessary at this stage, so long as it has been separated from the cellulose. Third, the separation of lignin oligomers and/or monomers from the biomass is preferably carried out under atmospheric pressure and room temperature or close thereto. Most of the current wide scale commercialized delignification processes require high temperatures and pressurized conditions and/or utilize very hazardous and potentially polluting processes and are not feasible for large industrial scale production. These types of conditions require energy inputs to reach the high temperatures as well as specialized equipment to contain the high pressures both of which are sources of considerable expenditures and costly maintenance along with the other negatives.

According to a preferred embodiment of the present invention, there is a composition comprising an acid; a source of peroxide (includes all forms of peroxide, i.e. hydrogen peroxide, peroxide salts (organic and inorganic), peroxyacids etc.) and a capping agent which when used during a process to delignify biomass can achieve results of complete removal of lignin with loss of only 20% of the cellulose fibre mass under conditions of atmospheric pressure and room temperature conditions. Preferably, the process can yield cellulose with only a 15% loss in the fibre mass. More preferably, the process can yield cellulose with only a 10% loss in the fibre mass. Even more preferably, the process can yield cellulose with only a 5% loss in the fibre mass.

EXAMPLES

A composition according to a preferred embodiment of the present invention used in the delignification test was prepared by dissolving 1 molar equivalent of taurine into sulfuric acid and subsequently adding hydrogen peroxide. Once this step was completed, a capping agent was added to the composition to obtain a modified Caro's acid composition with capping agent.

In one of the preferred composition, the final composition comprised sulfuric acid:taurine:hydrogen peroxide:ethanol in a 5.0:1.0:1.0:3.0 molar ratio. The resulting pH of the composition is less than 1. Preferably, the resulting pH of the composition was less than 0.5. A range of compositions with the same components but with various molar ratios were prepared and the delignification testing carried out on those compositions are reported in Table 4.

According to another embodiment, the sulfuric acid was combined with hydrogen peroxide and ethanol (as capping agent) and methanesulfonic acid (as a modifier or modifying agent). The resulting ratio was 5:1:3:1. A range of compositions with the same components were prepared and the delignification testing carried out on those compositions are reported in Table 3. More optimal results were obtained by changing the ratio of the chemicals present in the composition.

The compositions were clear and odorless with densities between 1.1 and 1.8 g/cm$^3$. One of the advantages of the composition used in the process according to the present invention was the decreased reactivity of the composition as it is being prepared and upon exposure to the lignocellulosic feedstock. Preferably, the capping agent is incorporated into the aqueous acid composition to provide immediate capping to the lignin as it is exposed to the composition comprising the peroxide. Alternatively, the capping agent may be added to the feedstock prior to the exposure to the acidic composition. It is always desirable to carefully consider the amount of capping agent added as it will, in the cases the capping agent is a liquid, be diluting the composition and hence may have an impact on the reactivity of the delignification reaction, either in terms of the speed (rate) or extent of reaction or both.

When performing delignification of wood using a composition according to a preferred embodiment of the present invention, the process can be carried out at substantially lower temperatures than temperatures used in the conventional kraft pulping process. The advantages are substantial, here are a few: the kraft pulping process requires temperatures in the vicinity of 176-180° C. in order to perform the delignification process, a preferred embodiment of the process according to the present invention can delignify wood at far lower temperatures, even as low as 15° C. According to a preferred embodiment of the present invention, the delignification of wood can be performed at temperatures as low as 30° C. According to another preferred embodiment of the present invention, the delignification of wood can be performed at temperatures as low as 40° C. According to yet another preferred embodiment of the present invention, the delignification of wood can be performed at temperatures as low as 50° C. According to yet another preferred embodiment of the present invention, the delignification of wood can be performed at temperatures as low as 60° C. Other advantages include: a lower input of energy; reduction of emissions and reduced capital expenditures; reduced maintenance; lower shut down/turn around costs/scalability/lower technical support requirements/fewer permitting challenges or requirements vs large kraft process facilities/small footprint-land requirements/less pollution (chlorine or sulfite containing compounds are not use in the process according to the present invention)/recycling of chemicals; also, there are HSE advantages compared to conventional kraft pulping compositions.

In each one of the above preferred embodiments, the temperature at which the processes are carried out are substantially lower than the current energy-intensive kraft process which correlates to increased commercial viability, lower pollution, less investment and infrastructure requirements etc.

Moreover, the kraft process uses high pressures to perform the delignification of wood which is initially capital intensive, dangerous, expensive to maintain and has high associated turn-around costs. According to a preferred embodiment of the present invention, the delignification of wood can be performed at atmospheric pressure. This, in turn, circumvents the need for highly specialized and expensive industrial equipment such as pressure vessels/digesters. It also allows the implementation of delignification units in many of parts of the world where the implementation of a kraft plant would previously be impracticable due to a variety of reasons.

Some of the advantages of a process according to a preferred embodiment of the present invention, over a conventional kraft process are substantial as the heat/energy requirement for the latter is not only a great source of pollution but is in large part the reason the resulting pulp product is so expensive and has high initial capital requirements. The energy savings in the implementation of a process according to a preferred embodiment of the present invention would be reflected in a lower priced pulp and environmental benefits which would have both an immediate impact and a long-lasting multi-generational benefit for all.

Further cost savings in the full or partial implementation of a process according to a preferred embodiment of the present invention, can be found in the absence or minimization of restrictive regulations for the operation of a high temperature and high-pressure pulp digesters.

According to an aspect of the present invention, various degrees of cellulose crystallinity depending on the intended use of the cellulose can be achieved. For example, it may be advantageous to produce mostly amorphous cellulose fibres (intended for ethanol production, for example) or highly crystalline cellulose (intended for pharmaceutical industry application, as example).

Experiment #1

A preferred embodiment of the composition according to the present invention was tested to determine its ability to delignify a wood chip.

Commercially available lignin (Sigma-Aldrich; Lignin, kraft; Prod #471003) was also used as a control in the testing.

Commercially cellulose (Sigma-Aldrich; Cellulose, fibres (medium); Prod #C6288) was also used as a control in the testing.

The ability of a composition to remove lignin from a wood sample was evaluated by performing a number of experiments with varying molar ratios of several components. A desirable result is one which dissolves all of the lignin in the wood and leaves behind only high-quality cellulose. The ability of the tested composition to remove lignin was evaluated against a sample of lignin as well as a sample of cellulose fibres. Ideally, a composition must not dissolve/destroy more than 20% of the cellulose present in the sample. Preferably, a composition must not dissolve more than 15% of the cellulose present in the sample. More preferably, a composition must not dissolve more than 10% of the cellulose present in the sample. Ideally as well, a treated sample of wood should not contain more than 20% by mass of residual lignin. Preferably, a treated sample of wood should not contain more than 10% by mass of residual lignin. More preferably, a treated sample of wood should not contain more than 5% by mass of residual lignin.

Wood pellets were utilized as the feedstock that were processed through a mill to yield product that were predominantly smaller than 2 mm. Also incorporated as a feedstock were walnut shells (typically consumed for sandblasting (12-20 grit) or burned as well as pure pine shavings as well as hemp straw, alfalfa straw, wheat straw, peanut shells and mill feed. All of these items are common, widely available feedstocks and are typically not converted to a commercially viable product in scale.

The compositions prepared are clear, odorless solutions of pH<0; densities are between 1.1 and 1.8 $g/cm^3$; the blends decompose when heating, so boiling points have yet to be established.

Delignification Testing

Compositions according to preferred embodiment of the present invention were tested to determine their ability to separate the lignin from a sample of a lignocellulosic material, in this case, wood. The experiments were carried out using two controls, lignin and cellulose, in order to assess the impact of each composition on each of those components separately and independently. The results from a first series of experiments where the molar ratios of each component of the composition are reported in Table 1 below.

TABLE 1

Results of the delignification reactions carried out at room temperature under atmospheric pressure using sulfuric acid, hydrogen peroxide and ethanol as capping agent

| $H_2SO_4:H_2O_2$:EtOH | recovery [mass %] | | | Appearance of wood |
|---|---|---|---|---|
| (mol ratio) | wood | lignin | cellulose | after reaction |
| 5:1:1 | n/a | n/a | n/a | Runaway reaction |
| 5:1:3 | 0.00 | 0.00 | 0.00 | |
| 5:1:4 | 12.5 | 0.00 | 0.00 | Brown-black |
| 5:1:5 | 58.2 | 0 | 87.3 | |
| 3:1:1 | 46.0 | 0 | 0 | |
| 3:1:3 | 36.0 | 0 | 81.0 | White powder |
| 3:1:5 | 53.7 | 0 | 100 | |
| 1:1:1 | 47.5 | 0 | 91.1 | White powder |
| 1:1:3 | 55.5 | 0 | 88.2 | Beige fibres |
| 1:1:5 | 76.0 | 0 | 79.0 | Brown fibres |

NB: in the case of runaway reactions, no measurements were recorded.

The data obtained from a first series of experiments of sulfuric acid without modifier and reported in Table 1 above, clearly establish that a composition comprising sulfuric acid, peroxide and a capping agent can provide for substantial delignification of a lignocellulosic material when such operation is carried out at room temperature under atmospheric pressure.

The results from a second series of experiments without modifier where the molar ratios of each component of the composition are reported in Table 2 below.

TABLE 2

Results of the delignification reactions carried out at room temperature under atmospheric pressure using sulfuric acid, hydrogen peroxide and methanol as capping agent

| $H_2SO_4:H_2O_2$:MeOH | recovery [mass %] | | |
|---|---|---|---|
| (mol ratio) | wood | lignin | Cellulose |
| 3:1:3 | 37.6 | 0.00 | 83.1 |

The data obtained from a second series of experiments and reported in Table 2 above, clearly establish that a composition comprising sulfuric acid, peroxide and a capping agent can provide for substantial delignification of a lignocellulosic material when such operation is carried out at room temperature under atmospheric pressure.

The results from a third series of experiments where the sulfuric acid has a modifier which is methane sulfonic acid (MSA) and where the molar ratios of each component of the composition are reported in Table 3 below.

TABLE 3

Results of the delignification reactions carried out at room temperature under
atmospheric pressure using sulfuric acid, hydrogen peroxide and ethanol (as capping
agent) and a modifier on the sulfuric acid (MSA)

| $H_2SO_4:H_2O_2$:EtOH:MSA (mol ratio) | recovery [mass %] | | | Appearance of wood after reaction |
|---|---|---|---|---|
| | wood | lignin | Cellulose | |
| 5:1:3:1 | 0 | 6.00 | 0 | dark brown shavings (bark-like) |
| 10:2:6:1 | 3.22 | 2.73 | 3.73 | dark brown shavings (bark-like) |
| 3:1:3:1 | 32.0 | 0 | 89.0 | white film with some brown specs |
| 6:2:6:1 | 45.4 | 0 | 83.3 | white film with slight brownish discoloration |

The data obtained from a third series of experiments and reported in Table 3 above, clearly establish that a composition comprising sulfuric acid, peroxide, a modifier (MSA); and a amphiphilic molecule can provide for substantial delignification of a lignocellulosic material when such operation is carried out at room temperature under atmospheric pressure.

The results from a fourth series of experiments where the sulfuric acid has a modifier (taurine) and where the molar ratios of each component of the composition are reported in Table 4 below.

TABLE 4

Results of the delignification reactions carried out at room temperature
under atmospheric pressure using sulfuric acid, hydrogen peroxide
and ethanol (as capping agent) and taurine as a modifier

| $H_2SO_4:H_2O_2$:EtOH:Taurine (mol ratio) | recovery [mass %] | | | Appearance of wood after reaction |
|---|---|---|---|---|
| | wood | lignin | cellulose | |
| 5:1:3:1 | 27.0 | 16.0 | 122* | Brown pieces of wood shavings |
| 10:2:6:1 | 15.6 | 27.8 | 0 | |
| 3:1:3:1 | 43.0 | 0.00 | 86.0 | White film with some brown specs |
| 6:2:6:1 | 48.8 | 0.00 | 89.9 | White film with some brown specs |

*Cellulose values above 100 indicate an improperly dried and/or washed sample.

The data obtained from a fourth series of experiments and reported in Table 4 above, clearly establish that a composition comprising sulfuric acid, peroxide, a modifier (taurine); and a capping agent can provide for substantial delignification of a lignocellulosic material when such operation is carried out at room temperature under atmospheric pressure.

The results from a fifth series of experiments where the sulfuric acid has a modifier (triethanolamine, TEOA) and where the molar ratios of each component of the composition are reported in Table 5 below.

TABLE 5

Results of the delignification reactions carried out at room temperature
under atmospheric pressure using sulfuric acid, hydrogen peroxide
and ethanol as capping agent) and TEOA as a modifier

| H2SO4:H2O2:EtOH:TEOA (mol ratio) | recovery [mass %] | | | Appearance of wood after reaction |
|---|---|---|---|---|
| | wood | lignin | cellulose | |
| 5:1:3:1 | 32.0 | 0.00 | 92.0 | Brownish material |
| 10:2:6:1 | 37.1 | 0.00 | 80.3 | Brown wood shavings |
| 3:1:3:1 | 91.0 | 0.00 | 90.0 | Brown wood shaving texture |
| 6:2:6:1 | 65.2 | 0.00 | 89.4 | Light brown film |

The data obtained from a fifth series of experiments and reported in Table 5 above, clearly establish that a composition comprising sulfuric acid, peroxide, a modifier (TEOA); and a capping agent can provide for substantial delignification of a lignocellulosic material when such operation is carried out at temperatures ranging from 15-40° C. under atmospheric pressure.

The results from a sixth series of experiments where the sulfuric acid has a modifier (imidazole) and where the molar ratios of each component of the composition are reported in Table 6 below.

TABLE 6

Results of the delignification reactions carried out at various temperatures under
atmospheric pressure using sulfuric acid, hydrogen peroxide and ethanol (as capping
agent) and imidazole as a modifier

| H2SO4:H2O2:EtOH:Imidazole (mol ratio) | recovery [mass %] | | | Appearance of wood after reaction |
|---|---|---|---|---|
| | wood | lignin | cellulose | |
| 5:1:3:1 | 23.00 | 0.00 | 128.00* | White film with some brown specs |
| 10:2:6:1 | 6.83 | 0.00 | 1.72 | Brown wood shavings |

TABLE 6-continued

Results of the delignification reactions carried out at various temperatures under atmospheric pressure using sulfuric acid, hydrogen peroxide and ethanol (as capping agent) and imidazole as a modifier

| H2SO4:H2O2:EtOH:Imidazole | recovery [mass %] | | Appearance of wood after reaction |
|---|---|---|---|
| (mol ratio) | wood | lignin | cellulose | |
| 3:1:3:1 | 53.0 | 0.00 | 72.0 | Light brown powder with some shavings |
| 6:2:6:1 | 50.8 | 0.00 | 93.6 | White film |

*Cellulose values above 100 indicate an improperly dried and/or washed sample.

The data obtained from a sixth series of experiments and reported in Table 6 above, clearly establish that a composition comprising sulfuric acid, peroxide, a modifier (imidazole); and a capping agent can provide for substantial delignification of a lignocellulosic material when such operation is carried out at room temperature under atmospheric pressure.

The results from a seventh series of experiments without modifier where the molar ratios of each component of the composition are reported in Table 7 below.

TABLE 7

Results of the delignification reactions carried out at room temperature under atmospheric pressure using sulfuric acid, hydrogen peroxide and n-Propanol

| $H_2SO_4:H_2O_2$:n-PrOH | recovery [mass %] | | |
|---|---|---|---|
| (mol ratio) | wood | lignin | cellulose |
| 3:1:3 | 50.9 | 0.00 | 90.1 |

The data obtained from a seventh series of experiments and reported in Table 7 above, clearly establish that a composition comprising sulfuric acid, peroxide and a capping agent can provide for substantial delignification of a lignocellulosic material when such operation is carried out at temperatures starting at about 15 degrees Celsius under atmospheric pressure.

The results from an eighth series of experiments without modifier where the molar ratios of each component of the composition are reported in Table 8 below.

TABLE 8

Results of the delignification reactions carried out at room temperature under atmospheric pressure using sulfuric acid, hydrogen peroxide and boric acid (B-Ac) (as capping agent)

| $H_2SO_4:H_2O_2$:B-Ac | recovery [mass %] | | |
|---|---|---|---|
| (mol ratio) | wood | lignin | cellulose |
| 3:1:3 | 3.10 | 0 | 0 |
| 3:3:1 | 44.6 | 0 | 90.4 |

The data obtained from a second series of experiments and reported in Table 8 above, clearly establish that a composition comprising sulfuric acid, peroxide and a capping agent can provide for substantial delignification of a lignocellulosic material when such operation is carried out at room temperature under atmospheric pressure. Moreover, at an optimal ratio of compounds the yield of cellulose from the biomass can be greatly improved.

On the basis of the results from the testing which was carried out, it is expected that such compositions could be used on a wide variety of lignocellulosic plants and waste material in the removal of lignin and separation thereof from cellulosic material in such a way as to utilize equipment and processes which do not require high pressures and/or high temperatures. This allows for considerable amount of flexibility for the implementation of large-scale operations employing such processes as well as substantially smaller investments as the engineering complexities are greatly reduce because of the parameters under which the processes can be carried out. In addition to the greatly minimized capital expenditures, reduced technical complexities, pollution by-products reduction (or elimination), scalability utilizing existing infrastructure is viable resulting in further reductions of capital requirements.

The above experiment is a clear indication that the composition according to the present invention not only provides an adequate technology to delignify plant material and/or woody biomass waste, but is also valuable in controlling the ultimate degradation of cellulosic material into carbon black residue common in the Kraft process resulting in higher yields and qualities for industry thus increasing profitability while reducing emissions and the risk to the employees, contractors and public.

A method to yield glucose from wood pulp would represent a significant advancement to the current process where the conversion of such is chemical and energy intensive, costly, emissions intensive and dangerous all while not resulting in highly efficient results, especially in large-scale operations. It is desirable to employ a composition which can delignify lignocellulosic biomass but also allows industry a level of control in order to preserve the commercially valuable cellulose rather than degrading it to a non-commercial carbon black product resulting in higher efficiencies, increased profitability and yields along with increased safety and reduced overall costs. Preferably, said composition used under appropriate conditions can also generate highly crystalline cellulose. The crystallinity of cellulose can be assessed by methods such as X-ray diffraction. Preferably, a composition according to the present invention can generate cellulose which has a crystallinity level above 60%.

Analysis of the Cellulose Extracted

The cellulose recovered from the series of experiments was analyzed under X-ray diffraction in order to assess the crystallinity of the product. The results of the analysis are reported below in Table 9.

TABLE 9

Results of the XRD of various samples of cellulose recovered from the process according to a preferred embodiment of the present invention

| Sample # | Crystallinity in % |
| --- | --- |
| Sample 1 | 64.6 |
| Sample 2 | 62.9 |
| Sample 3 | 66.3 |
| Sample 4 | 64.2 |
| Sample 5 | 63.2 |

Sample #2 is a commercially available microcrystalline cellulose.

According to a preferred embodiment of the method of the present invention, the separation of lignin can be realized and the resulting cellulose fibres can be further processed to yield glucose monomers. Glucose chemistry has a multitude of uses including as a starting block in the preparation of widely used chemicals, including but not limited to, diacetonide, dithioacetal, glucoside, glucal and hydroxyglucal to name but a few.

The embodiments described herein are to be understood to be exemplary and numerous modification and variations of the present invention are possible in light of the above teachings. It is therefore to be understood that within the scope of the claims appended hereto, the invention may be practiced otherwise than as specifically disclosed herein.

The invention claimed is:

1. A delignification composition comprising:
a lignocellulosic material comprising lignin; and
an aqueous acidic composition comprising:
  an acid;
  a capping agent selected from the group consisting of methanol, ethanol, n-propanol, boric acid and combinations thereof; and
  a peroxide;
wherein the acid and the peroxide are present in a molar ratio ranging from 1:1 to 10:1, and
wherein the capping agent is reactive with a fragment of the lignin.

2. The delignification composition according to claim 1, further comprising a modifying agent selected from the group consisting of taurolidine, taurocholic acid, tauroselcholic acid, tauromustine, 5-taurinomethyluridine, 5-taurinomethyl-2-thiouridine, homotaurine (tramiprosate), acamprosate, taurates, and aminoalkylsulfonic acids where the alkyl is selected from the group consisting of C1-C5 linear alkyls and C1-C5 branched alkyls.

3. The delignification composition according to claim 1, wherein the acid and the capping agent are present in a molar ratio ranging from 1:1 to 10:1.

4. The delignification composition according to claim 1, wherein the acid and the capping agent are present in a molar ratio ranging from 1:1 to 5:1.

5. The delignification composition according to claim 1, wherein the acid and the capping agent are present in a molar ratio ranging from 1:1 to 3:1.

6. The delignification composition according to claim 1, further comprising a modifying agent, wherein the acid and the modifying agent are present in a molar ratio ranging from 1:1 to 5:1.

7. The delignification composition according to claim 1, further comprising a modifying agent, wherein the acid and the modifying agent are present in a molar ratio ranging from 1:1 to 3:1.

8. The delignification composition according to claim 1, wherein the acid is sulfuric acid.

9. The delignification composition according to claim 1, further comprising an alkylsulfonic acid selected from the group consisting of methanesulfonic acid, ethanesulfonic acid and combinations thereof.

10. The delignification composition according to claim 1, further comprising an arylsulfonic acid selected from the group consisting of orthanilic acid, metanilic acid, sulfanilic acid, toluenesulfonic acid, benzenesulfonic acid and combinations thereof.

11. The delignification composition according to claim 1, wherein the aqueous acidic composition has a pH of less than 1.

12. The delignification composition according to claim 1, wherein the aqueous acidic composition has a pH of less than 0.5.

13. The delignification composition according to claim 1, wherein the aqueous acidic composition has a density between 1.1 and 1.8 g/cm$^3$.

14. The delignification composition according to claim 1, wherein the lignocellulosic material is a wood.

15. The delignification composition according to claim 1, further comprising a modifying agent selected from the group consisting of imidazole, an N-alkylimidazole, an alkylsulfonic acid, an aryl sulfonic acid, triethanolamine, taurine, taurine derivatives and combinations thereof.

16. The delignification composition according to claim 15, wherein the acid and the modifying agent are present in a molar ratio ranging from 1:1 to 10:1.

17. The delignification composition according to claim 1, further comprising a modifying agent selected from the group consisting of imidazole, N-alkylimidazoles, alkylsulfonic acids, arylsulfonic acids, triethanolamine, taurine and combinations thereof.

18. The delignification composition according to claim 1, further comprising a modifying agent selected from the group consisting of imidazole, N-alkylimidazoles, alkylsulfonic acids, an arylsulfonic acids, triethanolamine, taurine, taurolidine, taurocholic acid, tauroselcholic acid, tauromustine, 5-taurinomethyluridine, 5-taurinomethyl-2-thiouridine, homotaurine (tramiprosate), acamprosate, taurates, and aminoalkylsulfonic acids where the alkyl is selected from the group consisting of C1-C5 linear alkyls and C1-C5 branched alkyls.

19. The delignification composition according to claim 18, wherein the acid and the modifying agent are present in a molar ratio ranging from 1:1 to 10:1.

* * * * *